United States Patent [19]

Ouchi et al.

[11] Patent Number: 5,183,341
[45] Date of Patent: Feb. 2, 1993

[54] SPEED SENSING BEARING UNIT

[75] Inventors: Hideo Ouchi, Sagamihara; Hiroya Miyazaki, Fujisawa, both of Japan

[73] Assignee: Nippon Seiko Kabushiki Kaisha, Tokyo, Japan

[21] Appl. No.: 862,644

[22] Filed: Apr. 3, 1992

[30] Foreign Application Priority Data

Apr. 3, 1991 [JP] Japan ............... 3-029364[U]

[51] Int. Cl.⁵ .................................. F16C 41/00
[52] U.S. Cl. .............................. 384/446; 384/448
[58] Field of Search ........... 384/448, 446, 537, 506, 384/512

[56] References Cited

U.S. PATENT DOCUMENTS

| | | | |
|---|---|---|---|
| 4,778,286 | 10/1988 | Kadokawa | 384/446 |
| 4,865,468 | 9/1989 | Kato et al. | 384/448 |
| 4,938,612 | 7/1990 | Yamada | 384/446 |
| 4,960,333 | 10/1990 | Faye et al. | 384/448 |
| 4,969,753 | 11/1990 | Kato et al. | 384/448 |
| 5,018,384 | 5/1991 | Hayashi et al. | 73/118.1 |
| 5,129,743 | 7/1992 | Faye et al. | 384/448 |

FOREIGN PATENT DOCUMENTS

| | | |
|---|---|---|
| 397309 | 11/1990 | European Pat. Off. |
| 400204 | 12/1990 | European Pat. Off. |
| 62-249069 | 10/1987 | Japan |
| 1-156464 | 10/1989 | Japan |

*Primary Examiner*—Lenard A. Footland
*Attorney, Agent, or Firm*—Foley & Lardner

[57] ABSTRACT

In a speed sensing bearing unit comprising a fixed ring with a pair of outer ring raceways on its inner peripheral surface, a pair of inner rings with inner ring raceways on their outer peripheral surfaces corresponding to the outer ring raceways, a plurality of rolling bodies provided between the fixed ring and the inner rings, a pulse rotor supported on one of the pair of inner rings, and a sensor supported opposing the outer peripheral surface of the pulse rotor, the pulse rotor comprises a main body of magnetic material having a cage-like cylindrical shape and a plurality of through-apertures formed at circumferentially evenly spaced intervals and an engaging element of a non-magnetic resilient material formed to be fitted into the through-apertures and having hook portions protruding from an inner peripheral surface of the engaging element to engage with grooves formed in the outer peripheral surface of the other of said inner rings.

1 Claim, 4 Drawing Sheets

SPEED SENSING BEARING UNIT

INDUSTRIAL FIELD OF UTILIZATION

The present invention is related to a speed sensing bearing unit which may be incorporated in anti-lock braking systems (ABS) and traction control systems (TCS) for rotatably supporting a vehicle wheel with respect to a suspension unit while also enabling sensing of the speed of rotation of the wheel.

DESCRIPTION OF THE PRIOR ART

In general a vehicle wheel must be supported so as to rotate freely with respect to a suspension unit. Furthermore, it is necessary to sense the speed of rotation of the wheel in order to control an anti-lock braking system (ABS) or traction control system (TCS) on a vehicle.

U.S. Pat. No. 4,938,612 discloses a conventional rotational speed sensing bearing unit adapted for this application.

FIG. 7 shows a construction of the unit as disclosed in U.S. Pat. No. 4,938,612.

In FIG. 7, a fixed ring 2 has inner and outer peripheral surfaces, a pair of outer ring raceways 1, 1 formed on the inner peripheral surface, and an attachment lug 3 formed on a radial extension of the outer peripheral surface, and then is supported on a suspension unit by means of the attachment lug 3.

Provided interior to the fixed ring 2 is a pair of juxtaposed inner rings 5, 5 each having an outer peripheral surface and an inner ring raceway 4 on the respective outer peripheral surface corresponding to the outer ring raceways 1, 1.

A plurality of rolling bodies 7, 7 are supported in position by respective retainers 6, 6 between the outer ring raceways 1, 1 of the fixed ring 2 and the inner ring race ways 4, 4 of the inner ring 5, 5, so that the inner rings 5, 5 are supported so as to be freely rotatable within the fixed ring 2.

The pair of inner rings 5, 5 are fitted over a small diameter portion 9 formed on an axially outer end portion of a rotatable axle 8 (illustrated by phantom lines), and both inner rings 5, 5 are fixedly clamped in position between a nut 10 (illustrated by phantom lines) threaded onto a threaded portion of the rotatable axle 8, and a shoulder 11 formed at an axially inner end of the small diameter portion 9.

One of the inner rings 5 (on the left in FIG. 7) has a cylindrical pulse rotor 12 of crank shape in cross section engagingly fixed to the outer peripheral surface thereof at an end portion of the inner ring 5.

A sensor 13 is supported on a portion of the fixed ring 2 between the outer ring raceways 1, 1, so as to oppose an external peripheral surface of the pulse rotor 12.

With a speed sensing bearing unit constructed as above, a wheel may be supported by the rotatable axle 8 so as to rotate freely with respect to the fixed ring 2 and the suspension unit supporting the fixed ring 2.

Furthermore, the rotational speed of the wheel may be detected through the speed sensing bearing unit.

Specifically, since the output from the sensor 13 changes corresponding to the rotation of the wheel, in frequency with change in the wheel rotational speed, if the output from the sensor 13 is input to a control unit (not shown in the figure), the wheel rotational speed can be determined, and the anti-lock braking system (ABS) or traction control system (TCS) can be appropriately controlled depending on the obtained value.

The above described conventional speed sensing bearing unit has the following problems which need to be solved.

Since the pair of inner rings 5, 5 are simply supported inside the fixed ring 2 by the plurality of rolling bodies 7, 7, then, it is easy for the separate inner rings 5, 5 to come out of the fixed ring 2 prior to fitting the inner rings 5, 5 onto the small diameter portion 9 during transport of the parts, or during assembly.

A technique to prevent the inner ring from coming out from inside an outer ring element on the fixed ring 2 and so on has been proposed, for example as in Japanese Utility Model Laid Open Publication No. 2-78811 (1990).

In this method, engaging protrusions formed on respective inner peripheral edges of retainers engage with respective engaging grooves formed on the outer peripheral surface of each inner ring.

The present invention, however, is concerned with the situation wherein it is not possible to form an engaging groove on the inner ring 5 because the pulse rotor 12 is fitted over and supported by the inner rings 5, and hence the above method cannot be adopted to this situation.

SUMMARY OF THE INVENTION

The speed sensing bearing unit of the present invention addresses the above mentioned problems.

Specifically, the present invention is directed to a speed sensing bearing unit comprising, as with conventional rotational speed sensing bearing units, a fixed ring with a double row outer ring raceway formed on an inner peripheral surface thereof, a pair of inner rings with inner ring raceways formed on respective outer peripheral surfaces thereof corresponding to the outer ring raceways, a plurality of rolling bodies provided between the outer ring raceways of the fixed ring and the respective inner ring raceways of the inner rings, a pulse rotor supported on one of the pair of inner rings, and a sensor supported on a portion of the fixed ring between the outer ring raceways and opposing an outer peripheral surface of the pulse rotor.

The pulse rotor in the speed sensing bearing unit of the present invention comprises a cage-shaped cylindrical main body of a magnetic material which has a plurality of apertures formed at evenly spaced intervals in a circumferential direction, and an engaging element of a non-magnetic and resilient material.

The pulse rotor is supported on an end portion of one of the inner rings while a hook portion of engaging element which protrudes from an inner peripheral surface at the end of the engaging element, engages with a groove formed in an end portion of the outer peripheral surface of the other of the inner rings.

DESCRIPTION OF THE PREFERRED EMBODIMENTS

Figure 1:
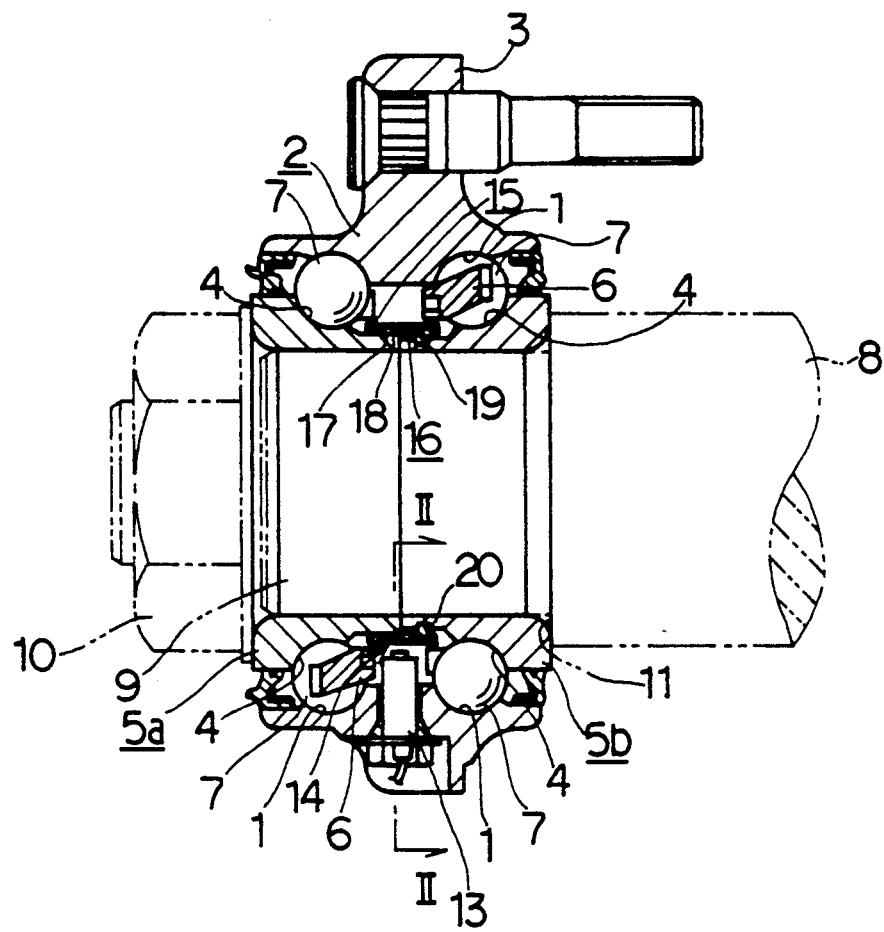
FIG. 1 is a cross sectional view of a first embodiment of the speed sensing bearing unit according to the present invention.

FIGS. 1 to 4 show a first embodiment of the present invention. A fixed ring 2 with double outer ring raceways 1, 1 formed on the inner peripheral surface thereof, is supported on a suspension unit by way of the attachment lug 3 formed on an outer peripheral portion thereof. Provided interior to the fixed ring 2 is a pair of inner rings 5a, 5b which has outer peripheral surfaces with a pair of inner ring raceways 4, 4 on the respective outer peripheral surfaces corresponding to the outer ring raceways 1, 1. A plurality of rolling bodies 7, 7 are supported in position by respective retainers 6, 6 between the outer ring raceways 1, 1 of the fixed ring 2 and the inner ring raceways 4, 4 of the inner rings 5a, 5b. As a result, the pair of inner rings 5a, 5b are supported so as to be freely rotatable within the fixed ring 2.

The pair of inner rings 5a, 5b are fitted over the small diameter portion 9 formed on the axial end portion of a rotatable axle 8 (illustrated by phantom lines), and both inner rings 5a, 5b are fixedly clamped in position between a nut 10 (illustrated by phanbtom lines) threaded onto a threaded portion of the rotatable axle 8, and a shoulder 11 formed at the inner end of the small diameter portion 9.

A pulse rotor 14 is press fitted on an axially inner end portion of the inner ring 5a (the right edge in FIGS. 1 and 3) of one of the pair of inner rings 5a, 5b (the left ring in FIGS. 1 and 3) so that an axially inner end portion of the pulse rotor 14 protrudes from the inner edge (the right edge in FIGS. 1 and 3) of the inner ring 5a.

The pulse rotor 14 comprises a main body 15 of magnetic material and an engaging element 16 of non-magnetic material assembled together. The main body 15 is made in a cage-like cylindrical shape by forming a plurality of apertures 17, 17 evenly spaced in a circumferential direction. With the first embodiment illustrated in the drawing, each of the apertures 17, 17 is formed closer to the axially inner end of the main body 15 (the right end in FIGS. 1,3). This is so that the width of the rib portion at the axially outer end fixed to the inner ring 5a (the left end in FIGS. 1 and 3) can be wider.

Figure 3:
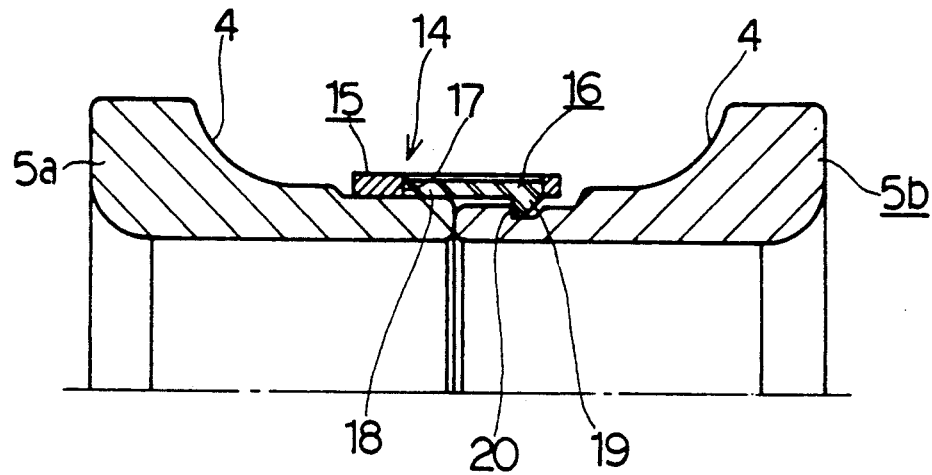
FIG. 3 is a cross sectional view of a half of the inner ring and pulse rotor of a first embodiment of the speed sensing bearing unit according to the present invention.
Figure 4:
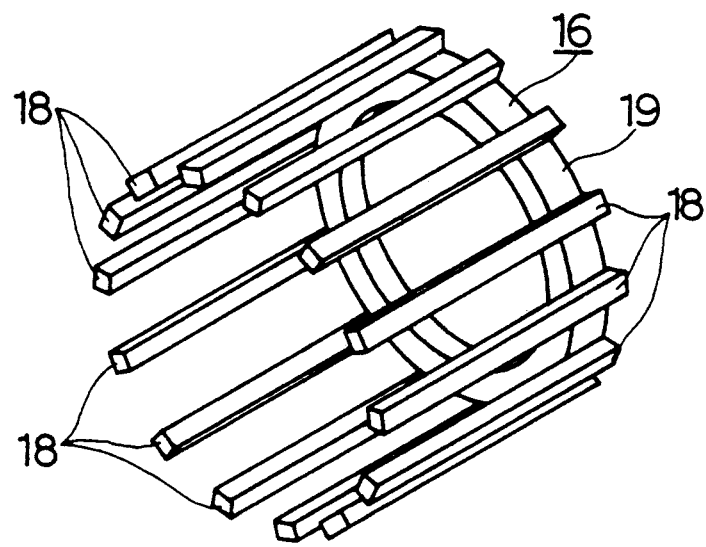
FIG. 4 is a perspective view of the pulse rotor of the first embodiment of the speed sensing bearing unit according to the present invention.

The engaging element 16 is made of a non-magnetic resilient material such as rubber or synthetic resin and formed as shown in FIG. 4. Engaging rods 18, 18 in FIG. 4 engage snugly in the through-apertures 17, 17 of the main body 15 without any plays therebetween, and are connected together at their axially inner ends (the right end in FIGS. 1, 3 and 4) by a ring member 19. The inner peripheral surfaces of the engaging rods 18, 18 are attached to the outer peripheral surface of the ring member The inner peripheral face of the ring member 18 has a conical surface which increases in inner diameter with axial distance towards the axially inner end of the en-gaging rods 18, 18, so that the ring member 19 may be engaged with an engaging groove 20 formed on the inner ring 5b (to be described later), providing the function of an engaging hook.

Figure 2:
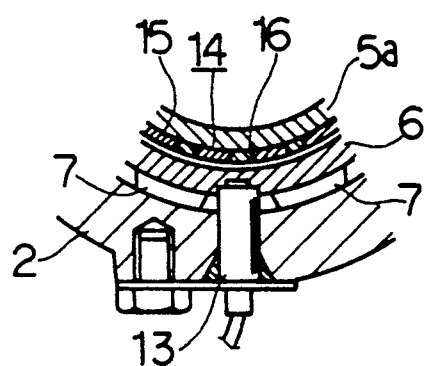
FIG. 2 is a partial, cross sectional view taken along the line II—II of FIG. 1.

With the main body 15 and engaging element 16 constructed as above, the engaging element 16 may be forcingly fitted inside the main body 15 under elastic deformation, and assembled so that the engaging rods 18, 18 of the engaging element 16 fit into the through apertures 17, 17 of the main body 15 with the axially outer ends of the engaging rods abutted to the rib portion of the main body 15 as shown in FIGS. 1 to 3 to give the pulse rotor 14. In this condition, the engaging hook of the ring member 19 of the engaging element 16 protrudes from the inner peripheral surface at the axially inner end of the main body 15.

In the case of the illustrated embodiment, the end tip detection portion of the sensor 13 fixed to the fixed ring 2 as shown in FIG. 1 is off set with respect to the axial center of the sensor 13. This is so that the detection portion can be located opposite the apertures 17, 17 of the pulse rotor 14 at the center (in the axial direction).

The pulse rotor 14 comprising the main body 15 and engaging element 16 is fixedly supported relative to the inner ring 5a by having the rib portion of the main body 15 fitted over the axially inner end portion of the inner ring 5a. In this condition, axially inner end portion of the pulse rotor 14 projects from the axially inner end of the inner ring 5a, and the ring member 19 of the engaging element 16 extends from the inner peripheral surface of the axially inner end portion of the end of the pulse rotor 14.

An engaging groove 20 is formed completely around the outer peripheral surface of the axially outer end portion of the other inner ring 5b of the pair of inner rings 5a, 5b. When the speed sensing bearing unit is assembled, the engaging hook of the ring member 19 is engaged with this engaging groove 20 thereby preventing the inner ring 5b from separating from the inner ring 5a.

Consequently, even before the inner rings 5a, 5b are assembled on the small diameter portion 9 of the rotatable axle 8, both of the inner rings 5a and 5b are held together and thereby prevented from coming out of the fixed ring 2.

In operation with the speed sensing bearing units of the present embodiment constructed as above, each of the inner rings is prevented from coming out from the inside of the fixed ring even prior to assembly due to the connetion between the pair of inner rings through the pulse rotor.

The speed sensing bearing unit of the present embodiment is used in the same way as the conventionally constructed bearing unit for sensing wheel speed and hence description of this use will be omitted for brevity.

Figure 5:
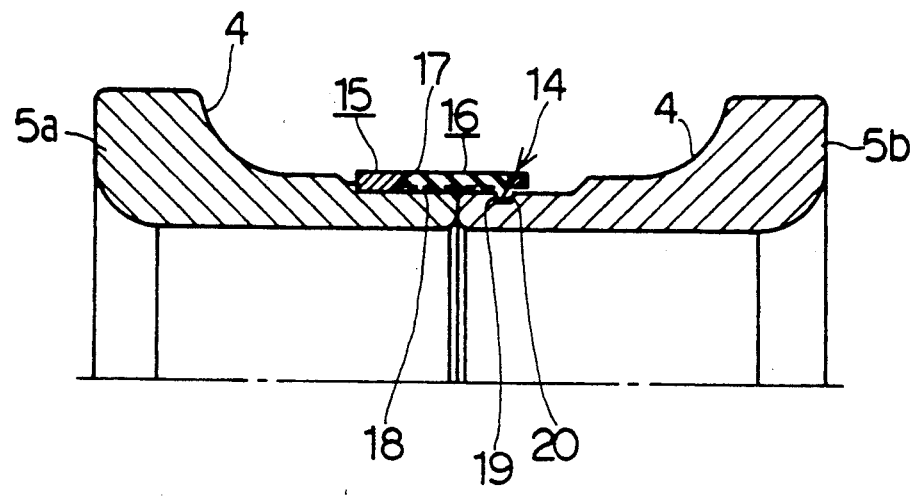
FIG. 5 is a cross sectional view of a half of the inner ring and pulse rotor of a second embodiment of the speed sensing bearing unit according to the present invention.
Figure 6:
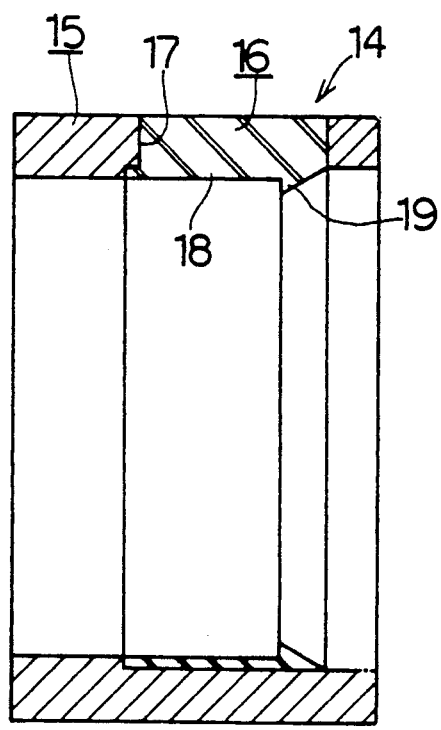
FIG. 6 is a perspective view of the pulse rotor of the second embodiment of the speed sensing bearing unit according to the present invention.
Figure 7:
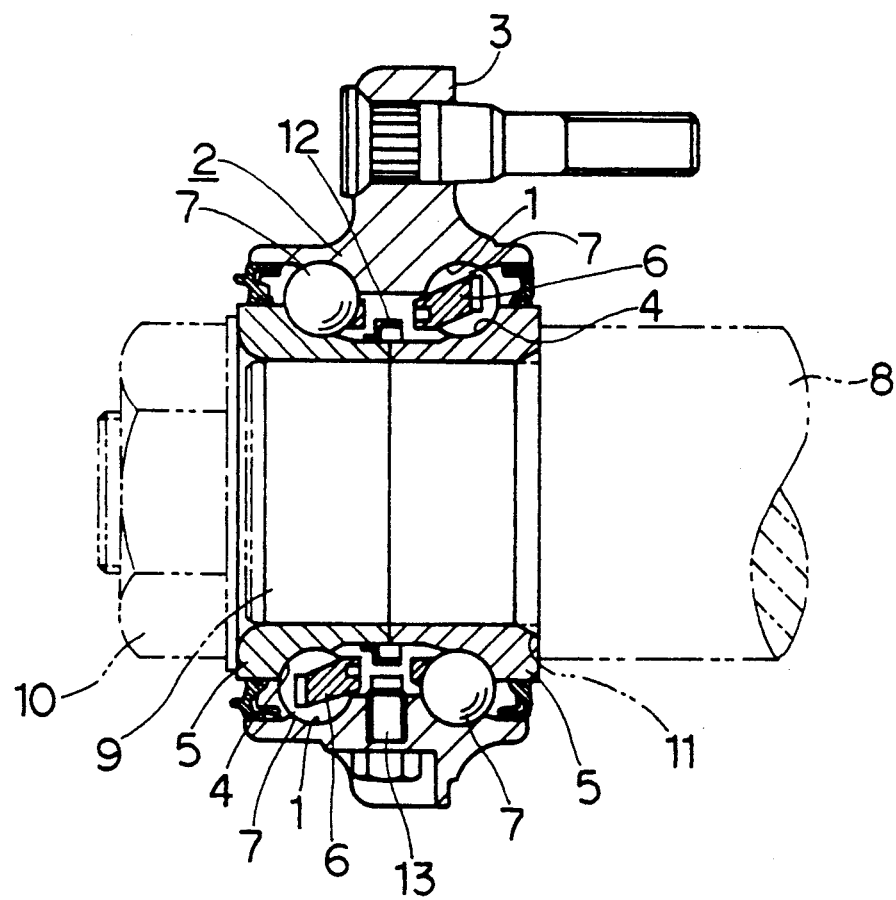
FIG. 7 is a cross sectional view of a prior art speed sensing bearing unit.

FIGS. 5 and 6 show a second embodiment of the present invention. In contrast to the first embodiment in which the engaging element 16 separately formed from the main body 15 and forcingly fitted inside the main bodyt 15 under elastic deformation, in this embodiment, the main body 15 is pre-set within a forming mold at the time of injection forming of the engaging element 16 so that the engaging element 16 is mold-formed inside the main body 15. Other details of construction and use are the same as for the first embodiment.

The speed sensing bearing unit of the present invention operates in a similar way to the previously mentioned conventionally constructed bearing unit. However prior to assembly, the inner ring is prevented from coming out of the fixed ring, thereby avoiding inconvenience during assembly and loss of components.

What is claimed is:

1. A speed sensing bearing unit comprising:
   a fixed ring having an inner peripheral surface and a pair of outer ring raceways formed on said inner peripheral surface,
   a pair of rotatable inner rings each having an outer peripheral surface and an inner ring raceway formed on said outer peripheral surface corresponding to said outer ring raceways, respectively,
   a plurality of rolling bodies provided between said outer ring raceways of said fixed ring and said inner ring raceways of said inner rings, respectively,
   a pulse rotor supported on one of said pair of inner rings and having an outer peripheral surface,
   a sensor supported by said outer ring between said outer ring raceways to oppose the outer peripheral surface of said pulse rotor,
   said pulse rotor comprising a cylindrical main body of magnetic material having a plurality of through-apertures at evenly spaced intervals in a circumferential direction, and an engaging element of a non-magnetic resilient material formed to be fitted into said through-apertures, and
   said inner rings having axial end portions facing to each other with said pulse rotor fitted over said axial end portion of one of said inner rings,
   the other of said inner rings having grooves formed in said axial end portion thereof on the outer peripheral surface thereof,
   said engaging element having an inner peripheral surface and hook portions protruding from said inner peripheral surface to engage with said grooves formed on said outer peripheral surface of the outer of said inner rings.

* * * * *